Aug. 23, 1932.                A. W. SCOTT                1,873,218
                              FREEZING TRAY
                            Filed Nov. 25, 1931

Inventor
Alva W. Scott
By Spencer Hardman & Fehr
his Attorneys

Patented Aug. 23, 1932

1,873,218

UNITED STATES PATENT OFFICE

ALVA W. SCOTT, OF DAYTON, OHIO, ASSIGNOR TO THE INLAND MANUFACTURING COMPANY, OF DAYTON, OHIO, A CORPORATION OF DELAWARE

FREEZING TRAY

Application filed November 25, 1931. Serial No. 577,237.

This invention relates to freezing containers especially such as are adapted for use in the sharp freezing compartments of domestic refrigerators.

An object of the invention is to provide an efficient freezing container which may be rapidly cooled by a cooling medium, such as brine, and which may have the frozen contents easily removed therefrom without danger of spilling the cooling medium and without danger of having the frozen contents coming into contact with the cooling medium.

A more specific object is to provide a freezing device having a flexible non-metallic inner container inserted within an outer container and having its marginal edges attached thereto to provide a space for the cooling medium between said two containers, said inner container being capable of being sufficiently flexed upwardly to remove its frozen contents without detaching its marginal edges from said outer container.

Further objects and advantages of the present invention will be apparent from the following description, reference being had to the accompanying drawing, wherein a preferred embodiment of one form of the invention is clearly shown.

Figure 1:
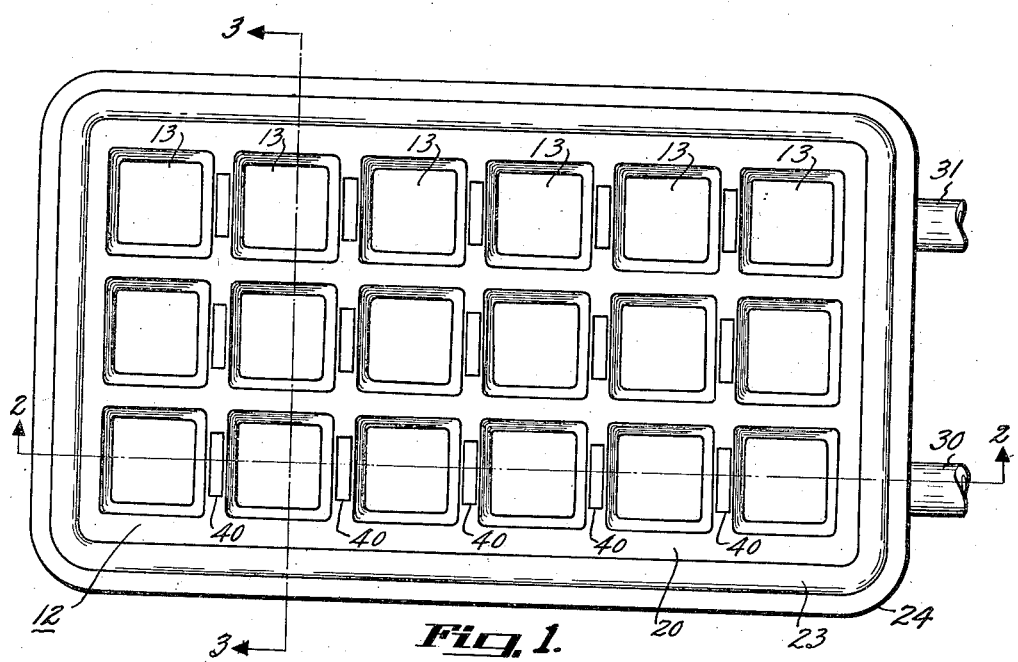
Fig. 1 is a plan view of a freezing container made according to this invention.
Figure 2:
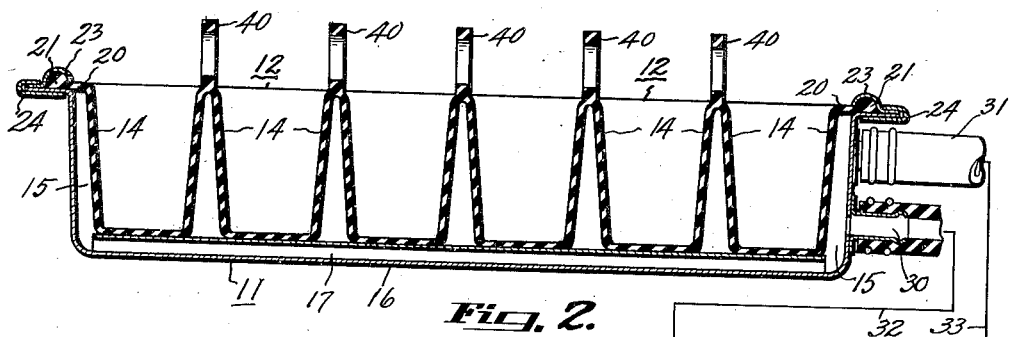
Fig. 2 is a vertical section on line 2—2 of Fig. 1 and in addition shows diagrammatically a brine circulating system.

11 designates the outer or brine container, herein shown as made of metal but which may be made of flexible rubber if so desired. The inner container 12 is made of a flexible non-metallic material and is preferably molded in one piece of soft flexible rubber having quite thin walls, as shown. This rubber container 12 is here shown as molded in one piece but with individual ice pockets 13 having their walls 14 spaced apart so as to leave circulating passages 15 therebetween and between the outer walls of container 12 and the lateral walls of outer container 11. The bottom walls of the ice pockets 13 are also preferably spaced from the bottom wall 16 of container 11 so as to provide a brine circulating space completely around the outside of each ice pocket 13. The bottom 16 of the outer metal container 11 is preferably provided with supporting ribs 17 of sheet metal permanently fixed, as by soldering or welding to the bottom 16, so as to provide a proper support for the flexible rubber ice pockets 13 when they are filled with water.

The upper marginal edges of the rubber container 12 are preferably permanently fixed in sealed relation to the adjacent walls of the metal container 11 to provide a completely enclosed space for the circulating brine or other cooling medium which may be employed. For this purpose, the upper marginal flanges 20 of container 12 have a soft rubber bead 21 which is partially surrounded and clamped directly to the marginal flanges 22 of the metal container 11 by the small sheet metal clamping strips 23 and 24, as clearly illustrated. This provides a very simple and efficient leak-proof joint between the respective marginal edges of the flexible rubber container 12 and the metal container 11.

Figure 3:
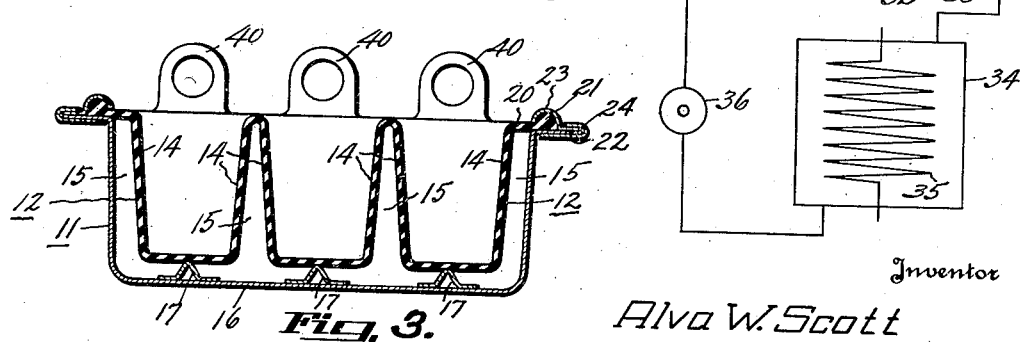
Fig. 3 is a vertical section on line 3—3 of Fig. 1.

A cooling medium, such as brine, is circulated in the intervening spaces 15 through inlet and outlet connections 30 and 31. Preferably the two ducts 32 and 33 carrying the brine to and from the connections 30 and 31 are quite flexible rubber hoses and so arranged that the freezing container may be easily removed bodily from its freezing compartment for filling or removing its frozen contents without strain upon said hose connections. Fig. 3 shows diagrammatically a brine cooling tank 34, a refrigerant coil 35 therein for cooling the brine, and a pump 36 for circulating the cooling brine to and from the freezing container. Obviously, if a plurality of such freezing trays are used in the same refrigerator a single brine tank 34 and single pump 36 can be easily arranged to supply the cooling brine to all the trays simply by having all the inlet ducts take off in parallel from a common inlet connection, and similarly for the outlet ducts.

To remove the frozen contents of the tray, it is withdrawn or partially withdrawn from the freezing compartment to a nearby suitable position, and then the flexible rubber container 12 may be easily pulled upwardly by hand from the outer container 11 at all points except at its margin to facilitate the removal of the ice blocks. To facilitate this partial lifting of the flexible rubber container the integral rubber tabs 40 may be provided whereby a more convenient handhold may be had. Obviously one, several, or all the ice cubes may be removed at one time by this method. To remove all the contents at one time, preferably the ice blocks are all first loosened by pulling slightly upon the tabs 40 and then the entire tray is inverted to cause them to drop out. This can be done since the brine is sealed in the intervening space 15 and can by no possibility be spilled or come into contact with the frozen ice blocks.

While the form of embodiment of the present invention as herein disclosed, constitutes a preferred form, it is to be understood that other forms may be adopted, all coming within the scope of the claims which follow.

What is claimed is as follows:

1. A freezing container comprising: a metal tray, a flexible non-metallic tray inserted therein but having a flexible wall thereof spaced from the adjacent wall of said metal tray to provide a circulating space for a cooling medium, and a cooling medium in said circulating space.

2. A freezing container comprising: a metal tray, a flexible non-metallic tray inserted therein, and having its upper peripheral edges sealed to the upper peripheral edges of said metal tray, some of the walls of said flexible tray being spaced from the walls of said metal tray to provide a circulating space for a cooling medium, and a cooling medium in said space.

3. A freezing container comprising: a metal tray, a flexible non-metallic tray inserted therein, and having its upper peripheral edges sealed to the upper peripheral edges of said metal tray, some of the walls of said flexible tray being spaced from the walls of said metal tray to provide a circulating space for a cooling medium, and a cooling medium in said space, and handle means for partially lifting said flexible tray from said metal tray whereby to facilitate the removal therefrom of the frozen contents.

4. A freezing device comprising: an outer container, a smaller flexible inner container inserted therein so as to provide an intervening space between said containers and having its upper marginal edges secured to the adjacent walls of said outer container whereby to seal said intervening space, and a cooling medium in said intervening space.

5. A freezing device comprising: an outer container, a smaller flexible inner container inserted therein so as to provide an intervening space between said containers and having its upper marginal edges secured to the adjacent walls of said outer container whereby to seal said intervening space, a cooling medium in said intervening space, and handle means projecting up from said inner container whereby to partially lift said inner container from said outer container to remove the frozen contents therefrom.

6. A freezing device comprising: a metal outer container, a flexible inner container inserted therein and having its upper marginal edges secured to the adjacent walls of said outer container, said inner container having spaced partitions therein providing a circulating space therebetween and the walls of said container, and a cooling medium in said circulating space.

In testimony whereof, I hereto affix my signature.

ALVA W. SCOTT.